(12) United States Patent
Goldman et al.

(10) Patent No.: US 6,788,777 B2
(45) Date of Patent: Sep. 7, 2004

(54) ALTERNATIVE TREATMENT FOR AIN FAULT HANDLING

(75) Inventors: Stuart O. Goldman, Scottsdale, AZ (US); David J. Zwick, Glendale, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 487 days.

(21) Appl. No.: 09/908,210

(22) Filed: Jul. 20, 2001

(65) Prior Publication Data

US 2003/0165228 A1 Sep. 4, 2003

(51) Int. Cl.[7] .......................... H04M 3/42; H04M 7/00
(52) U.S. Cl. .......................... 379/221.08; 379/207.02; 379/221.09; 379/221.12
(58) Field of Search .................. 379/221.08, 221.01, 379/273, 230, 207.02, 221.09, 221.12

(56) References Cited

U.S. PATENT DOCUMENTS 6,493,442 B1 * 12/2002 Goldman et al. ...... 379/207.02
6,625,273 B1 * 9/2003 Ashdown et al. ...... 379/221.13

* cited by examiner

Primary Examiner—Harry S. Hong
(74) Attorney, Agent, or Firm—David J. Zwick; Steven R. Santema

(57) ABSTRACT

An enhancement to AIN fault handling that allows SSP triggers to access an alternative treatment application when fault handling is invoked. If an alternative treatment application is referenced in the BCM fault handling attribute, then the application is called when AIN fault handling is invoked. If the alternative treatment application is not successful in completing the service function, then one of the traditional fault handling options is applied, (i.e., routing to a specific directory number, voice announcement then terminate call, continue, or final treatment). The present invention allows a last attempt at completing the service function by the alternative treatment application after fault handling is called, but before default handling or final treatment is invoked.

15 Claims, 2 Drawing Sheets

ALTERNATIVE TREATMENT FOR AIN FAULT HANDLING

FIELD OF THE INVENTION

The present invention relates to the field of intelligent telephony networks, and more particularly to fault handling in an Advanced Intelligent Network Service Switching Point.

BACKGROUND OF THE INVENTION

Advanced Intelligent Network (AIN) is a telephone network architecture that allows network elements to instantaneously affect the routing or processing of calls based on criteria other than that of simply finding a connection path through the network. Network intelligence is decentralized off of the switch and distributed among intelligent network platforms, referred to as Service Control Points (SCPs) or adjuncts, which will be collectively referred to as SCPs. Switches such as End Offices and Access Tandems that support AIN capabilities are called Service Switching Points (SSPs). The AIN SSP is described in standards document GR-1298-CORE, "AINGR: Switching Systems," Issue 6, November 2000, Telcordia Technologies, which is hereby incorporated by reference.

SCPs typically include data bases in which customer-specific information is stored for use by the network to route or affect the processing of calls. An SCP receives a query message from the SSP when the SSP requires assistance in routing a call and/or providing a feature. The SCP responds to the SSP with routing and/or processing instructions for the call. In AIN, relatively inexpensive peripheral computers can provide flexible and efficient call processing, and carriers can design and release new calling services by modifying the SCP data. SCPs can perform a wide variety of functions, ranging from providing simple instructions or data resources to managing the overall delivery of calling services. AIN also allows for the local SSP to act as feature/service host for these service function applications.

FIG. 1 shows a block diagram of an example of an AIN network. End Offices EO 1-A and EO 1-B are connected to Access Tandems AT 2-A and AT 2-B over voice trunks 5-A and 5-B. AT 2-A and AT 2-B are connected over voice trunk 9. Switches 1-A, 1-B, 2-A and 2-B form a traditional telephone network. Signal Transfer Point STP 3-A is connected to switches 1-A and 2-A over Signaling System 7 (SS7) links 6-A and 7-A. Signal Transfer Point STP 3-B is connected to switches 1-B and 2-B over SS7 links 6-B and 7-B. STP 3-A and STP 3-B are connected over SS7 link 10. Signal Transfer Points are network elements that route signaling messages in the AIN network. Service Control Points SCP 4-A and SCP 4-B are connected to STP 3-A and STP 3-B over SS7 signaling links 8-A and 8-B.

AIN is based on a basic call model that describes the essential processing steps done by an SSP in establishing a two-party call. FIG. 2 shows a portion of the AIN Originating Basic Call Model through sending a call setup indication to the Called Party ID. Each major call step is indicated by a box with a numbered step name inside, e.g., "1. O_NULL", "7. SEND_CALL", etc. Associated with the major call steps are trigger detection points, each indicated by a box with a "T". Each trigger detection point is further identified by a name, e.g., "(e1) Origination_Attempt". Trigger detection points identify when an SCP can receive notification of a given event and influence subsequent call processing. Each trigger detection point typically has several associated triggers that may be set. If a trigger is set at a certain trigger detection point, and the trigger is encountered during the processing of a call and no escape criteria are met, then the SSP will suspend normal call processing and send a query message to the SCP requesting call routing or feature instructions. Upon receiving a response from the SCP, the SSP closes the transaction and resumes call processing per the SCP instructions.

Each AIN trigger is defined by many attributes that describe, for example, where in the call model the trigger is, under what criteria the trigger will be activated, the address of the SCP to which the SSP will send its request message, and fault handling for conditions such as timer expiration or resource failure.

As part of the design of an AIN service, fault handling must be considered. There are generally three categories of faults: protocol errors, application errors, and resource failures.

Protocol errors are caused by incorrect messages received at the SSP from the SCP. Examples include incorrect or unexpected message types, missing parameters, fundamental encoding problems with the message, and unrecognized SS7 TCAP transaction IDs in which the SSP can't associate the received message to an open transaction.

Application errors are errors that are associated with messages received at the SSP from the SCP that violate the requirements associated with sending the message and are of a non-protocol nature. Examples include response message timer expired, missing conditional parameters, and erroneous data values.

A resource failure occurs when a hardware or software resource within the SCP, SSP, or IP is unable to provide functionality that is necessary for the completion of an operation requested by a message. Examples include link failures, and situations where the SCP is unable to locate an application program requested by an operation.

Within each category of error, there are fatal errors, which are conditions that cause an operation to be unsuccessful and may cause a transaction to be closed, and non-fatal errors, which are error conditions that do not interfere with the completion of an operation. An example of a fatal error would be a voicemail operation where the link to the SCP containing the voicemail functionality is unavailable. In this case, the voicemail operation is aborted. An example of a non-fatal error would be a calling name and number operation where the calling name is not returned. In this case, the calling number can be displayed with, for example, "not available" displayed for the calling name. The transaction was not successful, but the call was completed.

SUMMARY OF THE INVENTION

The present invention is an enhancement to AIN fault handling that allows SSP triggers to access an alternative treatment application when fault handling is invoked. If an alternative treatment application option is referenced in the BCM fault handling attribute, then the application is called when AIN fault handling is invoked. If the alternative treatment application is not successful in completing the service function, then one of the traditional fault handling options is applied, (i.e., routing to a specific directory number, voice announcement then terminate call, continue, or final treatment). The present invention allows a last attempt at completing the service function by the alternative treatment application after fault handling is called, but before default handling or final treatment is invoked.

In an example of the preferred embodiment of the present invention, a toll-free service is supplemented in the SSP with a caching scheme that tracks the last, for example, ten thousand toll-free numbers and their translations that were dialed by subscribers connected to the SSP. In the BCM fault handling attribute of the SSP toll-free service trigger, an alternative treatment application is referenced that will perform a look-up in the cached toll-free numbers. In the event of a link failure to the toll-free service SCP, fault handling will be invoked and the alternative treatment application will be called. If the called toll-free number is in the cached information, the alternative treatment application will return the translated directory number (DN) to the SSP, which will successfully complete the requested toll-free service function. If the alternative treatment application cannot find the called toll-free number in the cached information, then the alternative treatment application returns an error condition, and, in this case, the call is directed to final treatment.

DESCRIPTION OF THE PREFERRED EMBODIMENT

Figure 1:
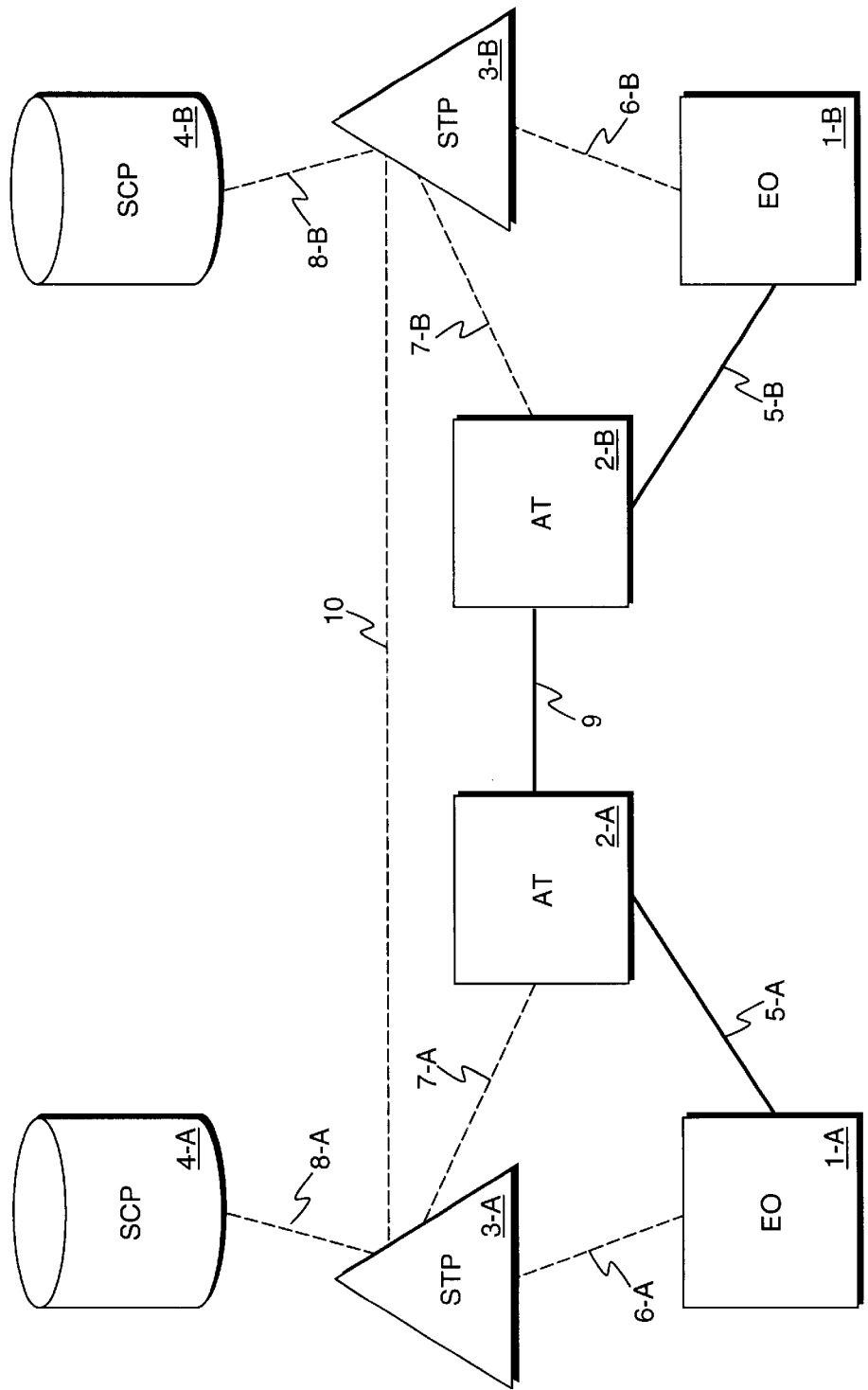
FIG. 1 shows a block diagram of an example of an AIN network.
Figure 2:
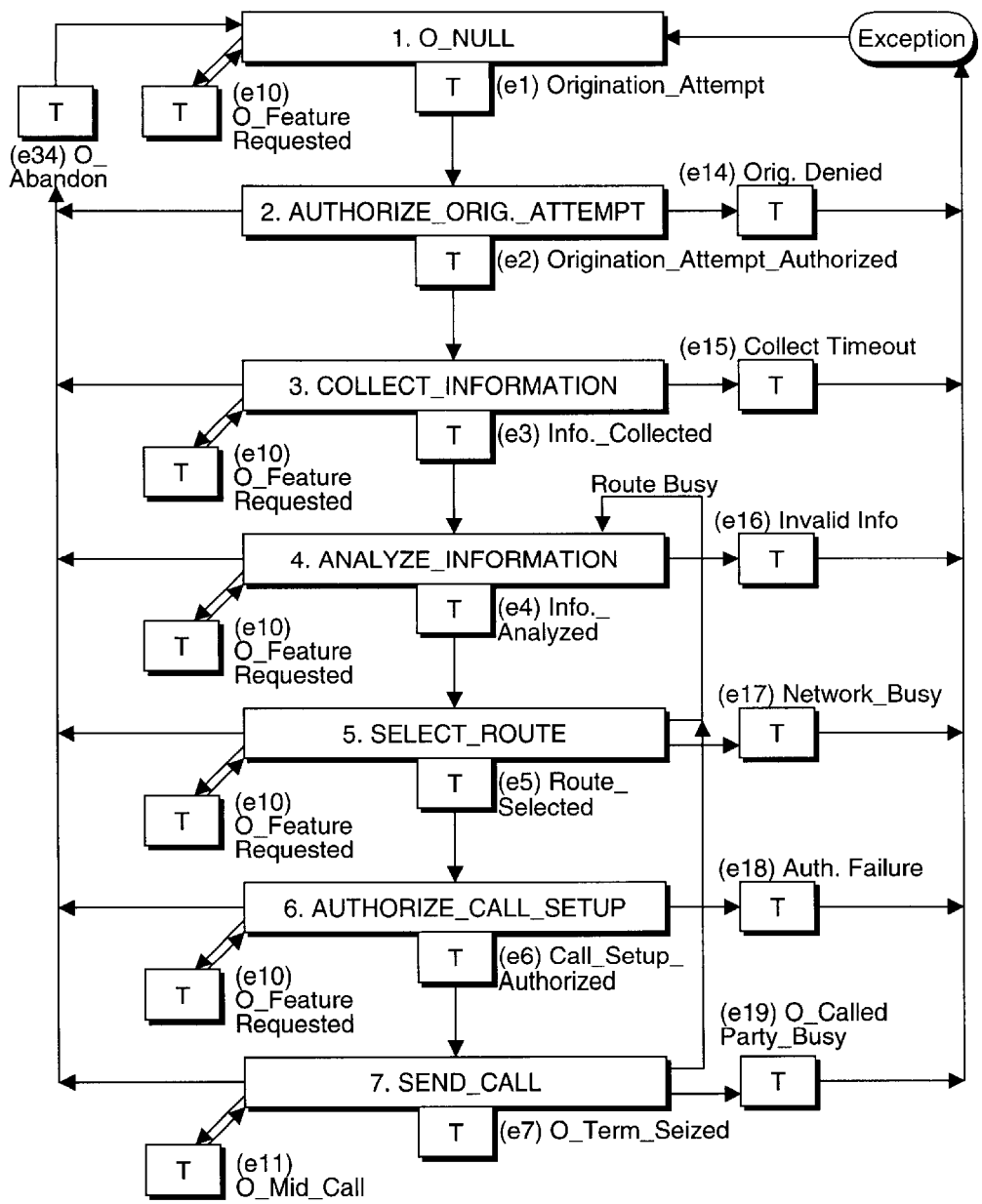
FIG. 2 shows a portion of the AIN Originating Basic Call Model through sending a call setup indication to the Called Party ID.

The present invention is a modification to the AIN SSP to extend fault handling capabilities. The invention is presented in the context of an AIN SSP and is described in terms of the AIN Information Model Dictionary and Attribute Definitions, as described in GR-1298. The Information Model Dictionary describes high level entities, and the Attribute Definitions define the details of the entities. In this document, all entity and attribute names will be capitalized without the use of underscores.

The present invention introduces a new service logic application referred to herein as the alternative treatment application. The alternative treatment application can reside on a SCP, an adjunct connected to the AIN SSP, or the local SSP. The alternative treatment application is called by the AIN fault handling routine in an attempt to complete the AIN service function when the normal SCP, adjunct or local SSP application has failed. If the alternative treatment application is successful, then the requested information is returned to the SSP, the AIN transaction is closed, and trigger or call processing continues. If the alternative treatment application is unsuccessful, then AIN fault handling continues and invokes one of the traditional fault handling options as specified by the BCM fault handling code for the trigger.

With the exception that the alternative treatment application is invoked as part of AIN fault handling, the alternative treatment application is designed and coded in similar fashion to other service logic applications that may be implemented on a SCP, an adjunct connected to the AIN SSP, or the local SSP.

In the context of the AIN Information Model Dictionary and Attribute Definitions, Service Logic Host Route is an entity that represents routing and access control information for an application in a feature/service host that is involved in communicating call-associated and non-call-associated messages. In order to send a message to an application in a feature/service host and to validate access, Service Logic Host Route provides routing and access control information. It is also a component of Trigger Item.

Service Logic Host Route can be viewed as a table having several columns that are referred to as the attributes of Service Logic Host Route, and rows that define the service logic host routes of an AIN SSP. It contains information to determine where to gain access to service logic after a trigger event has occurred. An instance of Service Logic Host Route is referenced (i.e., pointed to) from an instance of Trigger Item via the Service Logic Host Route ID. The service logic host can be an adjunct, SCP, or SSP (for an SSP, triggering occurs for a local switch-based feature). SCP addressing can be indirect (using translation type and global title address information) or direct (using SCP destination point code).

The following are the currently defined subtypes of Service Logic Host Route: Direct SCP Application Route, Adjunct Application Route, Indirect SCP Application Route and Local SSP Application Route.

The present invention defines a new Service Logic Host Route subtype entity of Alternative Treatment Application Route. Alternative Treatment Application Route is a service logic host route that points to a network system (i.e., an adjunct or SCP) in the AIN architecture that contains service logic platform functionality for performing an alternative treatment function, or to an alternative treatment application in a local SSP. This entity is an alias for Direct SCP Application Route, Indirect SCP Application Route, Adjunct Application Route and Local SSP Application Route. The single attribute of Alternative Treatment Application Route is Alternative Treatment Application Route ID, which is an alias for attributes Service Logic Host Route ID, Direct SCP Application Route ID, Indirect SCP Application Route ID, Adjunct Application Route ID and Local SSP Application Route ID. Alternative Treatment Application Route is a special purpose Service Logic Host Route subtype entity that is referenced as part of the fault handling routine.

Trigger Item is an entity that provides a correlation of trigger criteria with Service Logic Host Routes to facilitate the administration of triggers that are available to AIN users in an SSP. Trigger Item provides persistent trigger-related information that is independent from, but assignable to, a SSP User Resource (e.g., directory number, public dialing plan, etc). Trigger Item defines reusable, macro-like trigger criterion and Service Logic Host Route information. Trigger Item can be viewed as a table having several columns that are referred to as the attributes of Trigger Item. When an AIN service is to be offered that requires new trigger-related information in an SSP, a service provider needs to add a new instance of Trigger Item (i.e., add a row to the Trigger Item table) in the SSP. The information described by that instance of Trigger Item is administered independent of the assignments to an SSP User Resource.

Among the attributes of Trigger Item are several that control fault handling. These attributes are BCM Fault Handling Code, Default Routing Control Code, Default Routing Directory Number and Default Routing Announcement ID. BCM Fault Handling Code provides the means to administer the type of fault handling that applies to an AIN call on a trigger item administration basis. The current options for fault handling, as coded in the BCM Fault Handling Code attribute, are default routing or final treatment. As coded in the Default Routing Control Code attribute, default routing offers the options of routing the call to a directory number specified in the Default Routing Directory Number attribute, playing an announcement specified in the Default Routing Announcement ID attribute followed by call termination, or continue call processing. Final treatment is administered on a SSP basis.

The present invention adds just-defined attribute Alternative Treatment Application Route ID to Trigger Item. The present invention also adds the following two options to BCM Fault Handling Code: Alternative Treatment With Default Routing Upon Failure, and Alternative Treatment With Final Treatment Upon Failure. These options could have domain values of, for example, 2 and 3. These two new options allow an attempt by the alternative treatment application at completing the service function upon failure by the primary service application. If the alternative treatment application subsequently fails, then either default routing or final treatment will be applied.

With regard to error reporting, current procedures can remain in place. This will alert craftspersons that a problem occurred in executing the primary service application. Additional reporting data may be generated by the alternative treatment application indicating success or failure in the secondary attempt at service function completion.

Operation of the present invention is described in the context of a toll-free service offering, such as "8XX" dialing. In this example, toll-free calling is enhanced in an AIN SSP to include a SSP caching scheme that comprises the last, for example, 1024 toll-free numbers dialed along with the associated translations as returned from the SCP. An alternative treatment application is developed that resides on the SSP. The alternative treatment application receives a query message with a dialed toll-free number, searches the cache, and responds with the translation if such information is in the cache. If the toll-free number is not found in the cache, the alternative treatment application returns a failure indication.

The alternative treatment application is defined according to the Local SSP Feature entity and related entities and attributes. A Local SSP Application Route entry is included in Service Logic Host Route, along with an Alternative Treatment Application Route entry as an alias to the Local SSP Application Route entry. In the Trigger Item entry for the toll-free service offering, Alternative Treatment Application Route ID is defined to point to the alternative treatment application entry of Local SSP Application Route. In the BCM Fault Handling Code for the trigger, option Alternative Treatment With Final Treatment Upon Failure is coded.

When a station connected to the SSP dials a toll-free number, the trigger is invoked. If the primary service logic application cannot successfully complete the service function because, for example, of a link failure to the SCP containing the toll-free service logic application, AIN fault handling is invoked. Since the BCM Fault Handling Code option Alternative Treatment With Final Treatment Upon Failure is selected, a query message containing the dialed toll-free number is passed to the alternative treatment application on the local SSP. If the alternative treatment application is able to translate the dialed toll-free number with information contained in the cache, then a response message is returned with the translation, and trigger processing continues and the call is properly routed. If the alternative treatment application is not able to translate the dialed toll-free number, a failure indication is returned. In this case, fault handling directs the call to final treatment. Error reporting data is generated indicating that the alternative treatment application did not contain the needed translation.

Since the implementation of AIN on an SSP is manufacturer and switch dependent, specific implementation details will not be given. However, a person having ordinary skill in the art of the present invention with a working knowledge of the specific AIN implementation details for a given manufacturer and switch will readily be able to implement the present invention on that manufacturer's switches or specific switch.

The AIN modifications required for Applicants' invention are limited to the AIN SSP and no modifications are needed at the AIN SCP/adjunct. Thus, installing the required modifications in one SSP does not require the modifications to be made to other SSPs not offering such features to their associated subscribers.

While the inventive system has been particularly shown and described, it is not intended to be exhaustive nor to limit the invention to the embodiment disclosed. It will be apparent to those skilled in the art that modifications can be made to the present invention without departing from the scope and spirit thereof. For example, a more or less extensive entity and attribute structure may be used to define the alternative treatment application capability without a loss to the underlying functionality of the present invention. It is intended that the scope of the invention be defined by the claims appended hereto and their equivalents.

What is claimed is:

1. An Advanced Intelligent Network (AIN) having an AIN service switching point (SSP), said AIN comprising:

an alternative treatment application residing on an intelligent network platform or said AIN SSP; and AIN trigger fault handling logic on said AIN SSP operated to invoke said alternative treatment application when said AIN trigger fault handling logic is invoked, said AIN trigger fault handling logic being invoked responsive to said AIN SSP detecting a failure of a primary service application residing on a service control point (SCP).

2. An AIN according to claim 1, wherein said AIN trigger fault handling logic is further operated to invoke default routing if said alternative treatment application fails.

3. An AIN according to claim 1, wherein said AIN trigger fault handling logic further operated to invoke final treatment if said alternative treatment application fails.

4. An AIN according to claim 1, further comprising:

Alternative Treatment Application Route subtype entity of Service Logic Host Route, which operates as an alias for entities Direct SCP Application Route, Indirect SCP Application Route, Adjunct Application Route and Local SSP Application Route;

Alternative Treatment Application Route ID attribute of said Alternative Treatment Application Route subtype entity, which operates as an alias for attributes Service Logic Host Route ID, Direct SCP Application Route ID, Indirect SCP Application Route ID, Adjunct Application Route ID and Local SSP Application Route ID;

said Alternative Treatment Application Route ID attribute of Trigger Item entity; and Alternative Treatment With Default Routing Upon Failure, and Alternative Treatment With Final Treatment Upon Failure options of BCM Fault Handling Code.

5. An AIN according to claim 1, wherein said alternative treatment application is further operated to produce error reporting data indicating success or failure of said alternative treatment application when said alternative treatment application is invoked by said AIN trigger fault handling logic.

6. A method of fault handling in an Advanced Intelligent Network (AIN) service switching point (SSP), comprising:

implementing an alternative treatment application on an intelligent network platform or said AIN SSP; and invoking said alternative treatment application from AIN trigger fault handling logic on said AIN SSP when said AIN trigger fault handling logic is invoked, said AIN trigger fault handling logic being invoked responsive to said AIN SSP detecting a failure of a primary service application residing on a service control point (SCP).

7. A method according to claim 6, further comprising:
invoking default routing by said AIN trigger fault handling logic if said alternative treatment application fails.

8. A method according to claim 6, further comprising:
invoking final treatment by said AIN trigger fault handling logic if said alternative treatment application fails.

9. A method according to claim 6, further comprising:
defining Alternative Treatment Application Route as a subtype entity of Service Logic Host Route, and which operates as an alias for entities Direct SCP Application Route, Indirect SCP Application Route, Adjunct Application Route and Local SSP Application Route;
defining Alternative Treatment Application Route ID as an attribute of said Alternative Treatment Application Route entity, and which operates as an alias for attributes Service Logic Host Route ID, Direct SCP Application Route ID, Indirect SCP Application Route ID, Adjunct Application Route ID and Local SSP Application Route ID;
defining said Alternative Treatment Application Route ID attribute as an attribute of Trigger Item entity; and
defining Alternative Treatment With Default Routing Upon Failure, and Alternative Treatment With Final Treatment Upon Failure as options of BCM Fault Handling Code.

10. A method according to claim 6, further comprising:
producing error reporting data by said alternative treatment application indicating success or failure of said alternative treatment application when said alternative treatment application is invoked by said SSP AIN trigger fault handling logic.

11. A method of fault handling in an Advanced Intelligent Network (AIN) service switching point (SSP), the method comprising the SSP performing steps of:
querying a service control point (SCP) coincident to attempting a primary service application;
detecting failure of said primary service application due to a fault condition associated with said SCP; and
responsive to detecting failure of said primary service application, invoking an alternative treatment application on an intelligent network platform or said SSP.

12. The method of claim 11, wherein the step of detecting a failure comprises detecting a protocol error associated with a message received at the SSP from said SCP.

13. The method of claim 11, wherein the step of detecting a failure comprises detecting an application error associated with a message received at the SSP from said SCP.

14. The method of claim 11, wherein the step of detecting a failure comprises detecting a resource failure coincident to querying the SCP.

15. The method of claim 11, further comprising:
detecting failure of said alternative treatment application; and
responsive to detecting failure of said alternative treatment application, invoking a traditional fault handling option comprising one of default routing, voice announcement or final treatment.

* * * * *